United States Patent
Biesdorf et al.

(10) Patent No.: US 10,496,053 B2
(45) Date of Patent: Dec. 3, 2019

(54) METHOD FOR INTEGRATED DATA HANDLING FOR ENGINEERING AND OPERATING A PLANT

(71) Applicant: Siemens Aktiengesellschaft, Munich (DE)

(72) Inventors: Andreas Biesdorf, Trier (DE); Matthias Jung, Bubenreuth (DE); Klaus-Juergen Langer, Oberasbach (DE); Denis Schroff, Eggenstein-Leopoldshafen (DE); Michael Unkelbach, Buckenhof (DE); Johannes Weiss, Lisberg (DE); Klaus Wendelberger, St. Leon-Rot (DE); Egon Wuchner, Biessenhofen (DE)

(73) Assignee: Siemens Aktiengesellschaft, Munich (DE)

( * ) Notice: Subject to any disclaimer, the term of this patent is extended or adjusted under 35 U.S.C. 154(b) by 488 days.

(21) Appl. No.: 15/106,168

(22) PCT Filed: Dec. 11, 2014

(86) PCT No.: PCT/EP2014/077359
§ 371 (c)(1),
(2) Date: Jun. 17, 2016

(87) PCT Pub. No.: WO2015/091198
PCT Pub. Date: Jun. 25, 2015

(65) Prior Publication Data
US 2016/0313709 A1    Oct. 27, 2016

(30) Foreign Application Priority Data
Dec. 20, 2013 (EP) .................. 13199230

(51) Int. Cl.
*G05B 13/04* (2006.01)
*H02J 4/00* (2006.01)
(Continued)

(52) U.S. Cl.
CPC .......... *G05B 13/041* (2013.01); *G06F 16/27* (2019.01); *H02J 4/00* (2013.01); *G05B 19/042* (2013.01)

(58) Field of Classification Search
CPC ................... G05B 13/041; H02J 4/00
See application file for complete search history.

(56) References Cited

U.S. PATENT DOCUMENTS

| 5,826,265 A | 10/1998 | Van Huben et al. |
| 2007/0136396 A1 | 6/2007 | Kulkarni et al. |

(Continued)

FOREIGN PATENT DOCUMENTS

GB    2 189 061 A    10/1987

OTHER PUBLICATIONS

Sprint; "User Guide—Samsung Epic 4G—Galaxy S phone"; Sprint's User Manuals; pp. 1-268; 2012.
(Continued)

*Primary Examiner* — Mark A Connolly
(74) *Attorney, Agent, or Firm* — Cozen O'Connor

(57) ABSTRACT

Method for integrated data handling for engineering and operation of a plant having a plurality of software applications with different functionalities, wherein the plurality of software applications are interconnected via a network, a common data model including data shared between at least two of the plurality of software applications is provided, the common data model is managed by a configuration data service, data specific to a single application is managed by an application specific configuration data service that is assigned to a number of applications such that flexible, (Continued)

consistent, performance-optimized and efficient management of the various heterogeneous systems in the plant is achieved.

13 Claims, 3 Drawing Sheets

(51) Int. Cl.
*G06F 16/27* (2019.01)
*G05B 19/042* (2006.01)

(56) References Cited

U.S. PATENT DOCUMENTS

| | | | |
|---|---|---|---|
| 2008/0183336 A1* | 7/2008 | Dykstra | G05B 13/041 700/282 |
| 2011/0276537 A1 | 11/2011 | Jegerlehner et al. | |
| 2013/0123950 A1* | 5/2013 | Monroe | G05B 15/02 700/52 |
| 2015/0148919 A1* | 5/2015 | Watson | G06N 7/005 700/31 |
| 2018/0259989 A1* | 9/2018 | Li | G05F 1/66 |

OTHER PUBLICATIONS

Office Action dated Jan. 29, 2018 which issued in the corresponding Chinese Patent Application No. 201480068209.X.
Sprint: "Users Manuals", Samsung User Guide-Samsung Epic 4G-a Galaxy S Phone, Aug. 10, 2010, pp. 74-75.

* cited by examiner

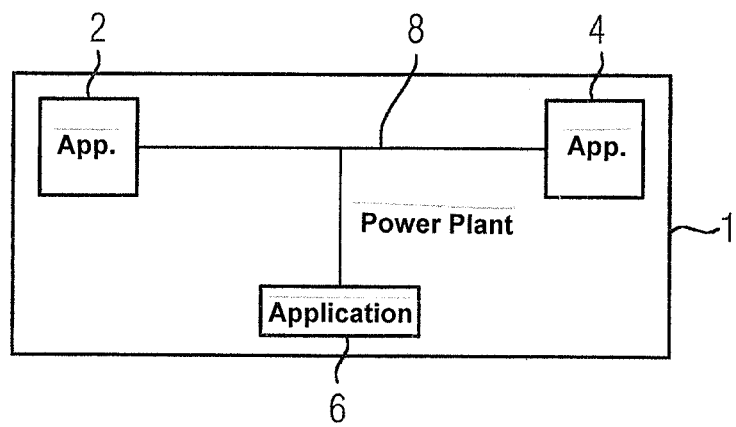
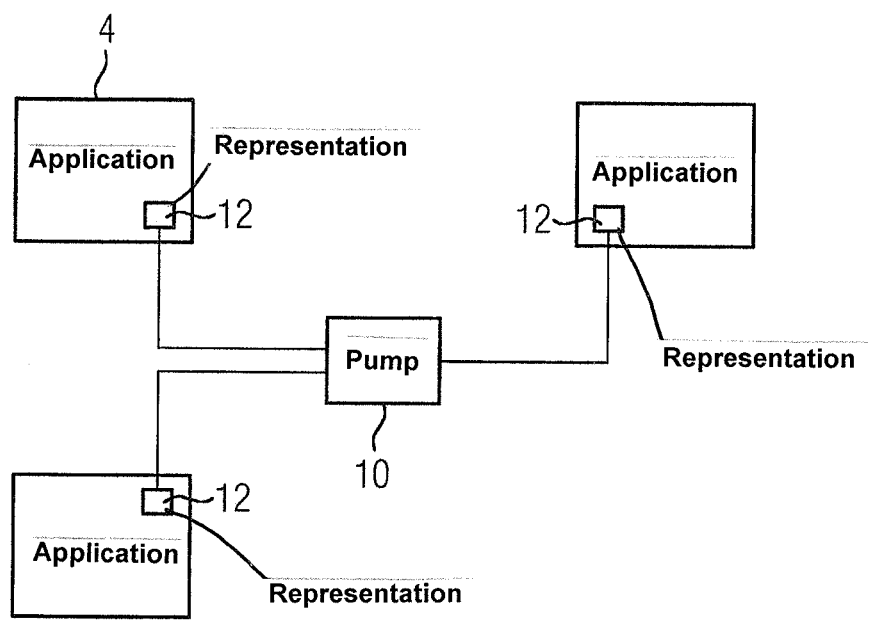

METHOD FOR INTEGRATED DATA HANDLING FOR ENGINEERING AND OPERATING A PLANT

CROSS-REFERENCE TO RELATED APPLICATIONS

This is a U.S. national stage of application No. PCT/EP2014/077359 filed 11 Dec. 2014. Priority is claimed on European Application No. 13199230 filed 20 Dec. 2013, the content of which is incorporated herein by reference in its entirety.

BACKGROUND OF THE INVENTION

1. Field of the Invention

The invention is related to a method for integrated data handling in a plant which is engineered and operated by a plurality of software applications having different functionalities, comprising interconnecting the software applications via a communication framework and mechanism.

Although in the following the invention is exemplified by a power plant, it is by no means restricted to power plants, but can be applied in any kind of plant.

2. Description of the Related Art

A power plant is a technical system that is built to execute a power generation process. The power generation process is a hierarchical process that uses hardware (e.g., field devices, pumps or a conveyer belt) to transform energy with the ultimate goal of generating electrical power. The operation, monitoring and controlling of the power plant is performed by an automation system respectively by humans. For this purpose, a multitude of heterogeneous software applications that realize the automation logics (e.g., automatic control loops), the possibilities for operator interactions etc. are required. Such software applications include, e.g., a distributed control system (DCS), an asset management system or a fleet control system.

One can distinguish two major phases: (1) the engineering phase and (2) the operation phase. It should be noted the tasks within the two phases are fundamentally different. The engineering phase includes the configuration of hardware setup, logics, or process parameters by using corresponding software applications. The plant erection and commissioning is also considered to be part of this phase. The operation phase includes operation and control of the power generation process at runtime. It should be noted that both phases are strongly connected, because the result of the engineering phase (i.e., the configuration of the hardware setup and logics) is required during the operation phase to run the plant operation process.

The fundamental differences between the tasks of the two phases are also reflected in the software applications. Thus, for both phases, a multitude of heterogeneous software applications for different aspects exists. Examples for different aspects in the engineering phase are hardware, software, and field-device engineering. In the operation phase, the aspects to be considered are monitoring, operation and control of the plant or even plant and fleet management and optimization. Some software applications are designed either for the engineering or the operation phase only. However, it should be noted there are also combined software applications, which support aspects of both the engineering phase and the plant operation phase (e.g., applicant's Siemens DCS SPPA-T3000). Different software applications have to use the same data. As a result, they need to be able to communicate within one phase (i.e., within the engineering or operation phase) as well as across both phases (i.e., the results of engineering need to be communicated to operational systems in the form of configuration data, but also vice-versa, for example, in case of a plant modernization project).

A consequence of such a heterogeneous software application landscape is that data related to the same item of a plant (e.g., data related to a water pump) is typically represented in multiple software applications. This is true for the engineering phase alone (e.g., configuration of data related to a water pump resides both in the hardware as well as the software engineering application) as well as for the operation phase alone (e.g., the operation time of a water pump is stored both in the distributed control system as well as in the asset management system) but also across both phases (e.g., the configuration data of a water pump is relevant for the operation of the distributed control system). Note that due to the loose coupling of the different software applications inconsistencies may occur, which are hard to detect due to several reasons: (1) variables representing the same data may be named differently, (2) variables representing different data may have the same names or (3) variables representing the same data are named identically, but their values are encoded in different encoding systems.

There is no standard data model in the power generation domain. As a result, the software applications described above typically have different internal data models. For data exchange between software applications, data model converters are therefore needed. Building data model converters is difficult, because often both syntactic and semantic data transformation is necessary. Moreover, data transformations use overall system performance, which may be a critical issue in particular during the operation phase.

For the engineering phase, two different approaches to solve these problems are known: (1) usage of a common or proprietary exchange data model and (2) usage of a metaengineering software application covering all aspects (in an optimal case) of the engineering phase.

The first approach provides an exchange data model that is understandable at least for pairs of software applications that need to communicate. The idea is to develop export and import interfaces at the boundaries of the different software applications that can transform the internal representation of data in the format of the exchange data model (export) and vice-versa (import). In general, such exchange data models and formats are defined bi-laterally on a proprietary basis. In certain domains (e.g., in the automotive industry) there exists a common exchange data model that can be used by all software applications. However, it should be noted in the engineering phase the use of an exchange data model can only decrease the number of inconsistencies but fails to eliminate them for several reasons. A main problem is that with loose coupling of the software applications by an exchange data model inconsistencies resulting from concurrent engineering in different software applications can generally not be avoided, because the engineering changes are isolated within the different software applications (i.e., concurrent changes are not synchronized automatically during engineering). Therefore, inconsistencies between multiple engineering software applications can only be detected through active communication. Moreover, while an exchange data model can help to detect inconsistencies through active communication, conflict resolution can only be done semi-automatically, i.e., with user-interaction. More specifically, in case of conflicts during import, it has to be decided which version to take (the local or the imported one). If the local version is selected, the transfer back to the other software application is not guaranteed and inconsistencies may last forever. If the imported version is selected, valuable and correct local data may be overwritten, because the engineer of the other software application might not be aware of the consequences in the second software application. Finally, the use of an exchange data model does not ensure communication with all relevant software applications has been taken place, i.e., all engineering software applications working on the same entities have received the notification of an update of the engineering data. However, to assure efficient, integrated engineering across all software applications, constant communication (including semi-automatic conflict resolution) of the engineering changes is necessary, leading to a considerable increase of the associated engineering costs.

The second approach to solve the above-mentioned problems is to provide a meta-engineering software application. The idea of a meta-engineering software application is to manage all aspects (in an optimal case) of the engineering phase in one place. To this end, meta-engineering software applications have a special proprietary data model, which is generic enough to allow modeling all aspects of the engineering phase.

This approach has several issues: First, in reality there is no meta-engineering software application that covers all aspects of the engineering phase. Therefore, the definition of an exchange data model for communication with the remaining software applications including the provisioning of corresponding interfaces is still necessary to cover all aspects of the engineering phase. This is particularly true for communication across the two lifecycle phases (i.e., communication of the results of engineering to operational systems and vice-versa). Second, for the special case of combined software applications supporting aspects of both the engineering as well as the plant operation phase (e.g., the applicant's Siemens DCS SPPA-T3000), meta-engineering software applications need to have the possibility to integrate or plug-in the business logic of the combined software application. Third, the generic approach of the meta-engineering software application leads to huge configuration efforts for the software application itself, both with respect to the internal data model and with respect to the corresponding business logic. Fourth, as there is no or nearly no generic data model of the meta-engineering software application itself available, the same meta-engineering software application needed in slightly different environments (e.g., differing by one subsystem or different plants even with the same software application chain) is configured differently, so that a data and library exchange between different installations is not possible. Fifth, multi-user configurations are problematic, as users who want to work on different aspects of an object, i.e., on attributes that are not shared between subsystems, are hindered, as normally the complete object is either locked or different versions are created, which have to be merged later. Finally, inconsistencies between the different software applications are not completely eliminated, because often small and fast needed changes (e.g., during commissioning) are made in the engineering software applications of the subsystems, because the ex- and import mechanism takes too long. In this case the second approach has the same problems as the first approach.

SUMMARY OF THE INVENTION

In view of the foregoing, it is therefore an object of the invention to provide a flexible, consistent, performance-optimized and efficient method for an integrated data handling in a plant which is engineered and operated by several heterogeneous software applications.

This and other objects and advantages are achieved in accordance with the invention by a method comprising providing a common data model (CDM) that is used for data exchange between at least two software applications, managing the common data by a configuration data service (CDS), and managing data specific to a single software application by a respective application specific configuration data service (App-CDS) that is assigned to a number of applications.

The method of the invention is based on the consideration that the abovementioned problems can be solved by a CDM with a CDS managing the shared data, which is shared between software applications, combined with application-specific App-CDSs managing data specific to single software applications. Shared data represents data on an entity (same instance) that is modified or used in multiple applications (e.g., engineering of a specific water pump in the hardware and software engineering application). It should be noted that the CDS does not need to contain the union set of all data models of the communicating software applications, but the (potential) intersection set of all data models, leading to high efficiency. Furthermore, the coupling between the CDS and the App-CDSs guarantees consistency across all connected software applications.

By definition, the CDM advantageously includes no data, which is specific to a single software application only. Thus, the model only describes that part of the data that is shared between at least two software applications. Data, which is only used by a single software application, will not be part of the CDM. Therefore, the CDM is very stable, because the intersection set is much more resistant against data model changes in the connected software applications as well as against the addition of new software applications than a union set. Therefore, extension of the CDM is required only infrequently. For the same reasons, the CDS is quite simple and does not need extensions for the business logic of the connected software applications. The business logic remains entirely in the corresponding software applications.

The CDM defines a meta-model for objects and their relationships commonly used in the power generation domain. In particular, advantageous embodiments of the CDM comprise data types and/or telegram structures of the shared data. Thus, the CDM defines the structure of the shared data for all connected software applications. As part of the CDM, system keys and/or user keys are also modeled. With those keys, each instance of an object can be addressed unambiguously. The CDS manages the keys and guarantees the uniqueness of all system- and user-keys of all shared data over all software applications.

In a further advantageous embodiment, the communication from the CDS to any App-CDS is limited to the part of the CDM that is relevant to the respective software application. This limitation is implemented by an application-specific aggregate profile defining the relevant object types and/or attributes. By definition an aggregate profile represents the application-specific subset of the CDM.

In a further advantageous embodiment, vice-versa, the communication from any App-CDS to the CDS is limited to the shared data, i.e., data that is modeled in the CDM. This limitation is implemented by the App-CDS, which can determine, upon change of data in a software application, whether the data is part of the shared data. Only if an update affects shared data, the update is communicated to the CDS. In contrast, if an update affects application-specific data only, no communication to the CDS is initiated.

There are two preferable possibilities to share data between the CDS and an App-CDS: (1) sharing by aggregate profile, and (2) sharing by concrete instance.

In a first advantageous embodiment, the App-CDS can subscribe to a set of objects and attributes by communicating an aggregate profile. Whenever an instance of an object contained within the aggregate profile is created, updated or deleted, the CDS notifies the App-CDS upon change.

In a second advantageous embodiment, the App-CDS can limit the communication of shared data to a number of concrete instances. These instances do not need to be part of the aggregate profile. In other words, an App-CDS can explicitly share data of a concrete instance with the CDS, which is not part of the aggregate profile, as long as the data type is part of the CDM. It should be noted with this approach, only the selected instances of this data type are communicated, while with the previous approach all instances of the data type are communicated.

After sharing the changed data with the CDS, the method preferably comprises the further steps of writing, by the CDS, the changed data to a common data store (CDS-DS), determining, by the CDS, which App-CDSs share the changed data with the CDS, and sending, by the CDS, the changed data to the determined App-CDSs. Here, it should be noted the CDS-DS is essentially a database (where the data model is defined by the CDM), which stores the shared data. In other words, the CDS stores the changed data in the CDS-DS and informs all App-CDSs that actually share an object or attribute of an object upon update, and distributes the changes to the corresponding App-CDSs.

At the respective App-CDS, the method preferably comprises the further steps of providing a user of a software application with a choice of accepting or rejecting the changed data, upon accepting the changed data by the user, writing, by the App-CDS of the application, the changed data into its local data store (LDS), upon rejecting the changed data by the user, sending the respective local version of the changed data as new changed data to the CDS. Thus, the system does not enforce a synchronization of changed shared data immediately, but allows for temporary local inconsistencies to still give the user of the other software applications control over the configuration of his subsystem. The CDS therefore guarantees consistency between all software applications in a manner that allows temporary inconsistencies, but informs the user at each point in time exactly about the inconsistencies and how he can correct them. However, objects in the LDS that comprise the changed data preferably are blocked from any further changes until the choice has been made by the user. This ensures that local inconsistencies are not further increased by additional changes.

Data exchange for engineering and operation in a power plant is preferably controlled by the described method.

A CDS preferably comprises means enabling the CDS to interact in accordance with the described method. In particular, the CDS guarantees the uniqueness of all system- and user-keys of all shared data over all software applications, locks objects system-wide beyond software application limits, if a shared attribute is engineered in one of the engineering software applications and informs all App-CDSs that actually share an object or attribute of an object, if this object or attribute of an object was changed, and distributes the changes to the corresponding App-CDSs. The CDS does not perform any engineering business logic specific to an engineering software application, but only performs business logic related to the CDM and its consistency.

An App-CDS preferably comprises means enabling the App-CDS to interact in accordance with the described method. In particular, the App-CDS requests unique keys for a potentially shared object from the CDS in case of creating such an object, locks the object software application-wide in case a non-shared attribute is changed, or requests locking across all software applications from the CDS in case a shared attribute is changed by its software application. The App-CDS further sends changed attributes from potentially shared objects to the CDS and requests system-wide unlocking of the potentially shared object. The App-CDS holds a copy of potentially shared objects in its LDS, which may be enriched with additional non-shared attributes specific to the software application and contains the engineering business logic of the software application and guarantees the consistency of the application specific data model and the instances therein.

A power plant preferably comprises components such as a CDS and one or multiple App-CDSs.

The advantages achieved via the invention, in particular by providing a CDS managing a CDM and the instances therein and App-CDSs managing the subsystem specific data models (including the instances therein), particularly comprise a very high stability of the CDM, because the intersection set is much more resistant against data model changes in the subsystems as well as the addition of new subsystems than a union set. Therefore, extension of the CDM is required only infrequently. For the same reasons, the CDS is quite simple and does not need extensions for the business logic of the connected software applications. The business logic remains entirely in the corresponding software applications. Software applications remain quite autonomous and local engineering is performed, which especially is important for fast changes (e.g., in commissioning), but inconsistencies are tracked and can easily be fixed by the user. There are no hidden or undetected inconsistencies. An uncontrolled divergence of the application specific data models is prohibited. The system does not enforce the overwriting of maybe meaningful local data by an engineering operation of a different subsystem, because a local engineer can check the change before accepting it.

Locking of data across all software applications is only performed in cases that actually shared data are changed—otherwise only the corresponding engineering software application is affected. Therefore, users changing application specific data will not negatively interfere with each other, if they work on different software applications. This avoids the locking problem of meta-engineering software applications.

Third party software applications that are incompatible with the CDS and that do not implement a specific App-CDS can be easily adopted and integrated. An App-CDS for such a third party software application can be developed and by specifying an adapter (implementation for accessing the data of the third party application), the data to be exchanged with other applications can be communicated. Depending on the capabilities of the third party software application, it might also be possible to directly integrate the adapter into the business logic of the software application.

The system also provides a direct response for conflicts when objects or attributes get changed. This helps to plan modifications for other systems and to inform other experts.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Embodiments of the invention are explained in the following figures, in which:

FIG. 1 shows a schematic view of different software applications in a power plant;

FIG. 2 shows a pump in a power plant with different applications associated with the pump;

DETAILED DESCRIPTION OF THE EXEMPLARY EMBODIMENTS

Figure 3:
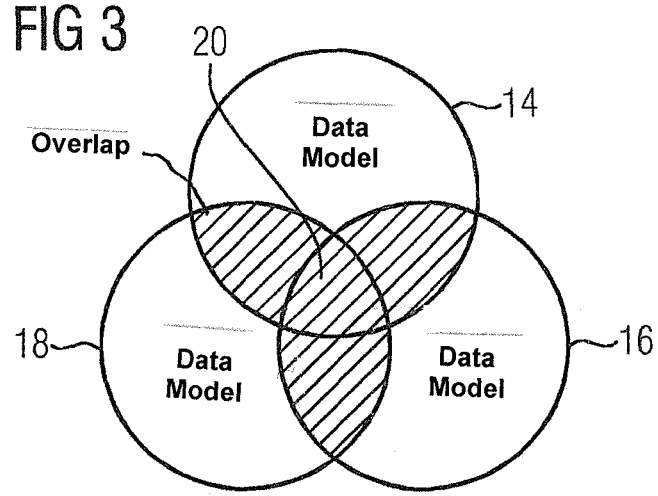
FIG. 3 shows a schematic of the data sets of the software applications in accordance with the invention.

Same reference numerals designate same parts in all figures.

FIG. 1 shows a schematic view of a power plant 1 with different, loosely coupled applications or subsystems 2, 4, 6, interconnected via a network 8. In general, one can distinguish operation applications 2, 4, 6, which control the system at runtime, and engineering applications 2, 4, 6, which are relevant for configuration and parameterization of a system before using it in a productive environment. On the configuration side, there are, for example, engineering applications 2, 4, 6 for fleets, engineering applications 2, 4, 6 for the plant infrastructure, and engineering applications 2, 4, 6 for parameterization of the automation software used. On the other hand, at runtime, there are applications 2, 4, 6 for the control of a fleet or a plant, as well as simulation and training applications 2, 4, 6. Many applications 2, 4, 6 provide both engineering and operation functionality.

Each of the different software applications for plant operation has been configured with a different engineering software application. The different software applications 2, 4, 6 are usually only loosely coupled and share information based on proprietary interfaces. However, in practice, the different software applications 2, 4, 6 represent information on the same objects within a power plant. A simple example is shown in FIG. 2 that shows the object of a pump 10, which has a representation 12 in the hardware engineering software application 2, in the software engineering software application 4 and in the asset management software application 6.

In the hardware engineering software application 2, for example, the cable connections and the location within the power plant 1 is denoted, while in the software engineering software application 4, for example, the control parameters are defined. An asset management software application 6, on the other hand, contains, for example, information on the maintenance status and the total uptime. While the different software applications 2, 4, 6 store different pieces of information on the entity "pump" 10, all of the software applications 2, 4, 6 share the name and the identifier of the pump 10. While the different software applications 2, 4, 6 store specific information on the pump 10, they also store some common information that is relevant to all software applications 2, 4, 6.

FIG. 3 shows a sketch of the relationship of the different data models 14, 16, 18 using three different exemplary software applications 2, 4, 6. It can be seen that the data models 14, 16, 18 of the different applications have an overlap 20 (shaded). At the same time, there are also certain parts of the data models 14, 16, 18, which are only used by a single application 2, 4, 6. The CDM described defines the data that need to be exchanged between the different applications 2, 4, 6. As a consequence, only the overlap 20 of the different data models 14, 16, 18 is described and each application 2, 4, 6 can still contain "private" information, outside of the CDM. The motivation for this is to obtain a stable model, because the intersection set is much more resistant against data model changes in the connected software applications as well as against the addition of new software applications than a union set. From FIG. 3, it is evident the CDM contains those parts of the information, which are shared or used by at least two applications 2, 4, 6. The remaining part of the information is beyond the scope of the CDM. A main advantage of focusing on the shared information is that the different applications 2, 4, 6 remain independent of each other and can still define their own "private" extensions of the model.

The CDM defines shared objects, i.e., objects that are exchanged between the different software applications 2, 4, 6. As shown in FIG. 3, the different software applications 2, 4, 6 have partially overlapping data models 14, 16, 18. The CDM represents the overlap 20 of the data models 14, 16, 18 of the different software applications 2, 4, 6 in a power plant 1. The model does not represent the union of the data models 14, 16, 18 of all software applications 2, 4, 6. Besides providing a basis for data exchange, the CDM allows the description of the general structure of a power plant 1. The central object "unit" and its specializations allow the definition of a hierarchy starting from the company level over a fleet level down to a functional complex or a functional group complex.

The CDM also defines a unique addressing schema and supports effective communication mechanisms between applications 2, 4, 6. The CDM allows for alignment with general standards such as the "Common Information Model" (CIM) and IEC standards. While the standards alone are not sufficient, the combination of the CDM and the general standards allow for integration with third party products.

The CDM defines a meta-model for objects and their relationship commonly used in a power generation domain. Especially data types and telegram structures of the exchanged life data as well as the system- and user-keys (unique identifiers) of shared objects (addressing purpose) are part of the CDM. The objects can be further extended within the software applications by private object types and attributes. These application-specific extensions are unknown to the CDM and only accessible within the corresponding software application. However, since the general model is defined by the CDM. Consequently, the CDS can handle instances of them. This enables the applications 2, 4, 6 to work on the same instance.

Figure 4:
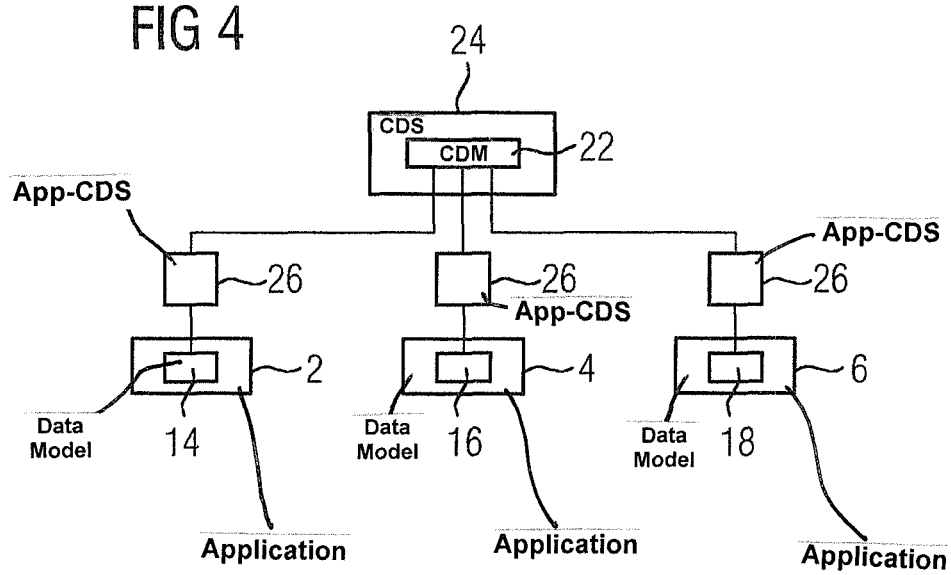
FIG. 4 shows the data structure in a power plant in accordance with the invention.

FIG. 4 shows the data structure in a power plant 1 with several applications 2, 4, 6. The CDM 22 is managed by a CDS 24. App-CDSs 26 manages the subsystem specific data models 14, 16, 18 (including the instances therein). The CDS 24 guarantees the uniqueness of all system- and user-keys of all shared data over all subsystems, locks objects system-wide beyond subsystem limits, if a shared attribute is engineered in one of the software applications and informs all App-CDSs 26 which actually share an object or attribute of an object, if this object or attribute of an object was changed and distributes the changes to the corresponding App-CDSs 26. The CDS 24 does not perform any business logic specific to a software application, but only performs business logic related to the common data model 22 and its consistency.

The App-CDSs 26 request unique keys for a potentially shared object from the CDS 24 in cases of creating such an object, lock the object software application-wide in case a nonshared attribute is changed, or request locking across all software applications from the CDS 24 in cases a shared attribute is changed by its software application. The App-CDSs 26 further send changed attributes from potentially shared objects to the CDS 24 and request system-wide unlocking of the potentially shared object. The App-CDSs 26 hold a copy of potentially shared objects in their own data model 14, 16, 18, which may be enriched with additional nonshared attributes specific to the software application and contain the engineering business logic of the software application and guarantee the consistency of the application specific data model 14, 16, 18 and the instances therein. Sharing objects between the CDM 22 and the application specific data models 14, 16, 18 can be achieved in two ways: The first possibility is that the App-CDS 26 hands over an application specific data model profile to the CDS 24, in which all data types and attributes are listed, which are shared with the CDM 22. Each instance with the attributes that fits to the profile are shared between the CDS 24 and the App-CDS 26 automatically. An example is a DCS with SW-Engineering, a HW-Engineering software application and field device engineering software application that are sharing analog measurements with their upper and lower limits via sharing by profile with the CDM 22 (and thus with each other).

The second possibility is that an App-CDS 26 can explicitly share an instance with the CDS 24, which was not declared in the profile, as long as the data type itself is shared. In this case, only the selected instances of this data type are shared, but not all instances of this data type. An example is a fleet management software application that shares a specific output signal of a DCS, e.g., the actual produced power of a certain power plant with the CDM 22 via sharing by instance and thus with the DCS software application (but not thousands of other output signals, which are not used in the fleet management). During operation the fleet management can subscribe the actual power values via the shared output signal (address information).

Figure 5:
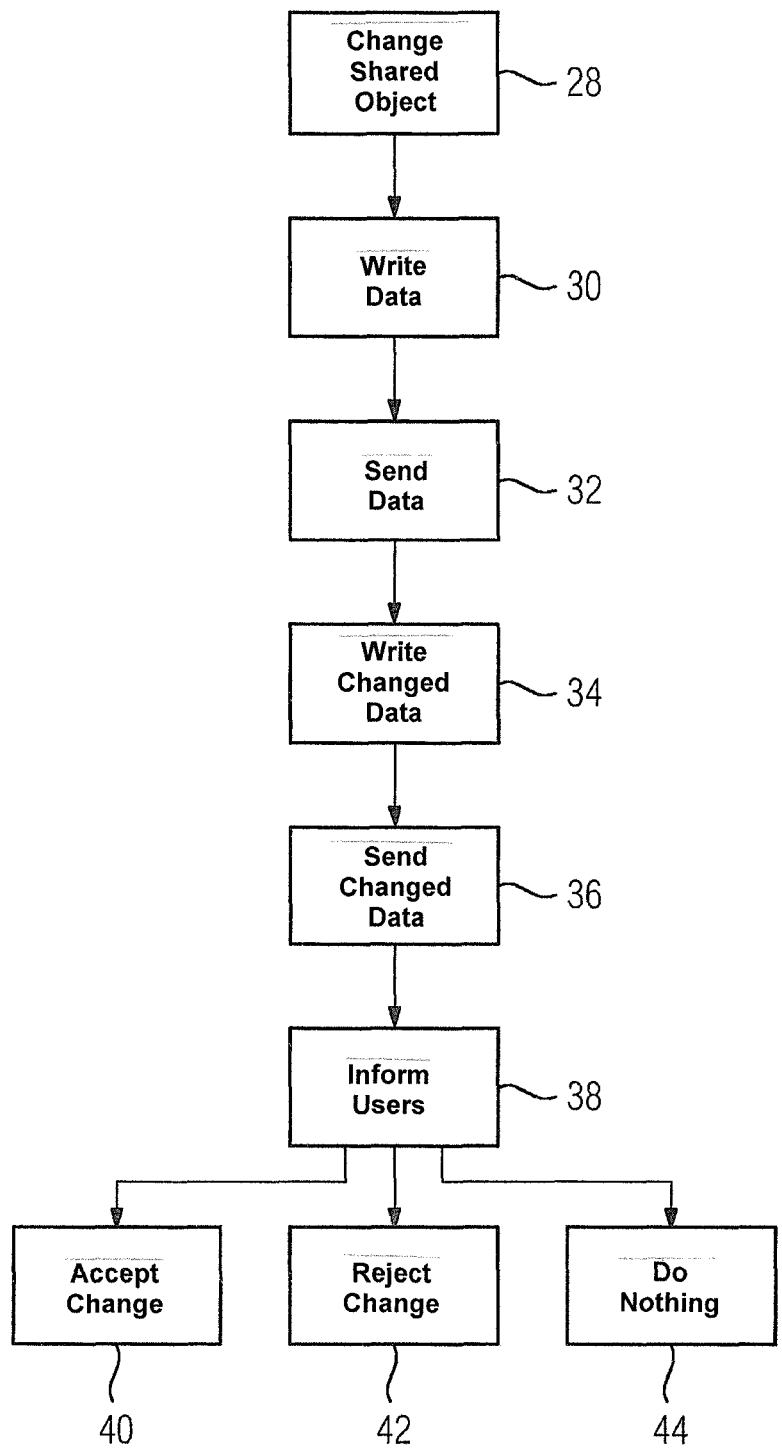
FIG. 5 shows a diagram of an actual data sharing process in accordance with the invention.

FIG. 5 shows how the sharing of data is done: A user at application 2 changes 28 a shared object and commits the changes, i.e., writes the changed data finally to the data model 14 of application 2. The App-CDS 26 of software application 2 writes 30 data to its LDS 14 and sends 32 them to the CDS 24. The CDS 26 writes 34 changed data to the CDM 22 and sends 36 changed data to all other App-CDSs 4, 6, which share this data with the CDM 22.

Users at other applications 4, 6, which share this data, are informed 38 via the corresponding App-CDSs 26, that a shared data relevant for them has been changed. They can perform the following actions:

Accept 40 the change: Changed data from the CDM 22 are transferred to the local data model 16, 18 by the corresponding App-CDS 26.

Reject 42 the change: The previous version of the local data model 16, 18 is written as changed by the App-CDS 26 and the CDS 24 to the CDS-DS 22. Afterwards, all other App-CDSs 26 (including that of software application 2) which shared this data are getting the changed values.

Do nothing 44: The message and the inconsistency remain until the change is finally accepted or rejected. However, a further engineering of this object in this application 4, 6 is only possible after the change has either been accepted or rejected, so that further inconsistencies are avoided.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for integrated data handling in a plant engineered and operated by a plurality of software applications having different functionalities, the method comprising:
   interconnecting the plurality of software applications via a communication framework and mechanism;
   providing a common data model including data shared between at least two of said software applications;
   managing the common data model by a configuration data service; and
   managing data specific to a single application by a respective application specific configuration data service;
   wherein the common data model includes no data specific to a single application.

2. The method of claim 1, wherein said common data model comprises at least data types of said shared data.

3. The method of claim 1, wherein said common data model comprises at least one of system keys of shared objects of said shared data and user keys of shared objects of said shared data.

4. The method of claim 1, wherein communication between application specific data stores and a configuration data store is defined by aggregate profiles with at least one of object types and object attributes.

5. The method of claim 1, further comprising:
   determining, by the application specific configuration data service, whether the data is part of the shared data or the application specific data, upon change of data in an application;
   sending the changed data to the configuration data service, upon determining the data is part of the shared data.

6. The method of claim 5, wherein said changed data is sent in an application specific data model profile comprising at least one of all data types and data attributes shared between the configuration data service and the application specific configuration data service.

7. The method of claim 5, wherein said shared data is limited to a number of instances of a data type and said changed data is sent to said instances.

8. The method of claim 5, further comprising the further steps of writing, by the configuration data service, the changed data to the common data model;

determining, by the configuration data service, which application specific configuration data services share said changed data with the common data model; and sending, by the configuration data service, said changed data to said determined application specific configuration data services.

9. The method of claim 8, further comprising:

providing a user of an application with a choice of accepting or rejecting the changed data;

writing, by the application specific data service of said application, the changed data into its local data model, upon acceptance of the changed data by the user; and sending a respective local version of the changed data as new changed data to the configuration data service, upon rejection of the changed data by the user.

10. The method of claim 9, wherein objects in said local data model that comprise the changed data are blocked from any further changes until said choice is made by said user.

11. A power plant having integrated data handling for engineering and operation, comprising:

a plurality of software applications; and a communication framework and mechanism;

wherein the power plant is configured to:

interconnect the plurality of software applications via the communication framework and mechanism;

provide a common data model including data shared between at least two of said software applications;

manage the common data model by a configuration data service; and manage data specific to a single application by a respective application specific configuration data service;

wherein the common data model includes no data specific to a single application.

12. A configuration data service comprising:

means for enabling the configuration data service to interact by:

interconnecting a plurality of software applications via a communication framework and mechanism; and providing the common data model including data shared between at least two of said software applications;

wherein the common data model includes no data specific to a single application.

13. A power plant comprising:

(i) a configuration data service comprising means for enabling the configuration data service to interact by:

interconnecting a plurality of software applications via a communication framework and mechanism; and providing the common data model including data shared between at least two of said software applications; and (ii) an application specific configuration data service including means enabling an application specific configuration data service to interact by managing data specific to a single application by a respective application specific configuration data service;

wherein the common data model includes no data specific to a single application.

* * * * *